United States Patent

[11] 3,600,636

[72] Inventor Tom Kastrup Petersen
Nordborg, Denmark
[21] Appl. No. 875,876
[22] Filed Nov. 12, 1969
[45] Patented Aug. 17, 1971
[73] Assignee Danfoss A/S
Nordborg, Denmark
[32] Priority Nov. 14, 1968
[33] Germany
[31] P 18 08 887.4

[54] ELECTRICAL APPARATUS COMPRISING A POWER SECTION AND A CONTROL SECTION WITH FLUID COOLING
11 Claims, 4 Drawing Figs.

[52] U.S. Cl. .......... 317/100
[51] Int. Cl. .......... H05k 7/20, H02b 1/10
[50] Field of Search .......... 317/100, 101 R

[56] References Cited
UNITED STATES PATENTS

| | | | |
|---|---|---|---|
| 3,091,722 | 5/1963 | Borowiec | 317/100 |
| 3,270,250 | 8/1966 | Davis | 317/100 |
| 3,383,565 | 5/1968 | Gritton | 317/101 |

FOREIGN PATENTS

| | | | |
|---|---|---|---|
| 323,970 | 11/1936 | Italy | 317/100 |

*Primary Examiner*—Lewis H. Myers
*Assistant Examiner*—Gerald P. Tolin
*Attorney*—Wayne B. Easton

ABSTRACT: The invention relates to an assembly of electrical apparatus which includes a power section and a control section. A container is provided for housing the power section and insulating cooling fluid for the power section. A cover plate of insulating material closes the top of the container and the control section is mounted on the cover plate. Holes are provided in the insulated cover plate with each hole being individually surrounded by a metal coating bonded to the insulating material. Connecting wires extend from above and/or below into the holes and each connecting wire terminates a short distance from the opposite side of its hole. Each connecting wire is soldered to the metal coating surrounding its hole to provide an electrical connection and to provide a fluid-tight seal for the hole. Printed circuit means on the underneath side of the cover plate includes the metal coatings surrounding the hole to provide electrical interconnections between the soldered connecting wires.

Figure 1:
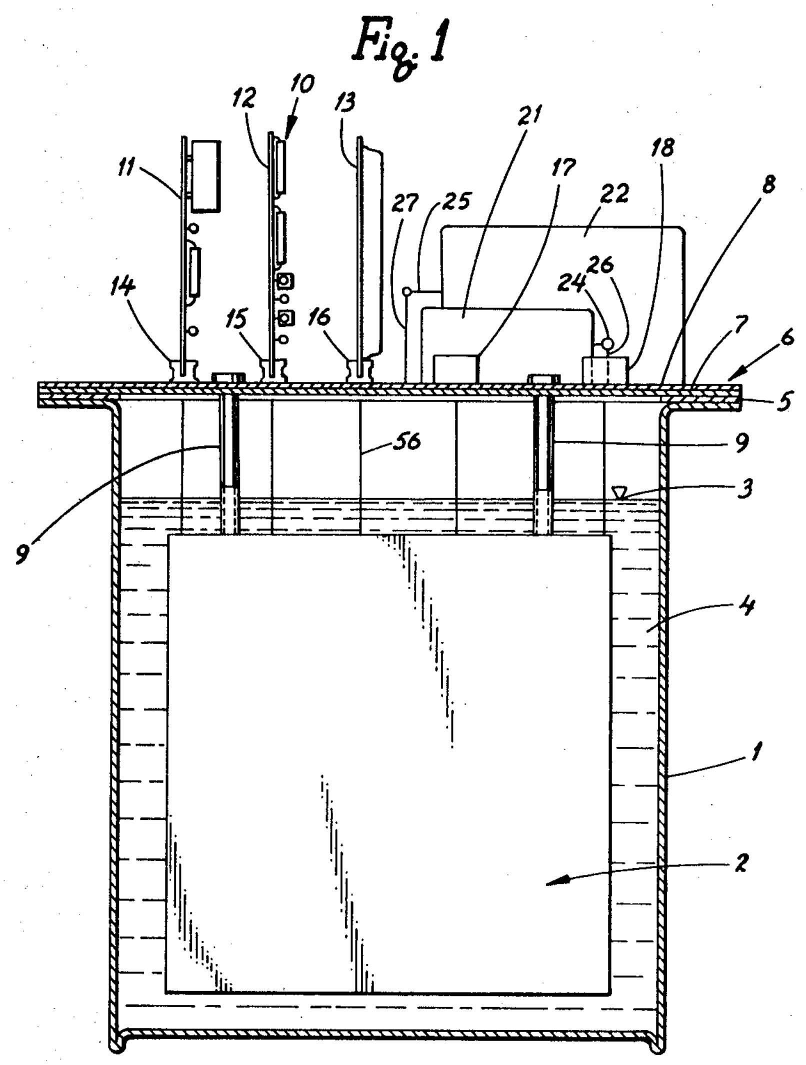

ELECTRICAL APPARATUS COMPRISING A POWER SECTION AND A CONTROL SECTION WITH FLUID COOLING

The invention relates to an electrical apparatus comprising a power section, at least part of which is accommodated in a container of insulating cooling fluid, and na associated control section, e.g. to a controlled power rectifier.

The heavy-current components of such an apparatus as a rule become heated up during operation. In order to prevent the temperature from rising too much, it is known to accommodate these components in a container filled with cooling oil and sealed so as to be oiltight; the container may have cooling fins on the outside. A substantial part of the switching elements of the control section however should not be exposed to the effects of the temperature of the power section and is therefore disposed outside the container. Since the power section often has to be connected to the control section through a considerable number of control leads, a corresponding number of oiltight insulating lead-through elements are required in the wall of the container. This involves a very complicated construction, which adds to the existing complication as regards circuitry (connection of the switching elements of the power section to each other, connection of the switching elements of the control section to each other, connection of the switching elements of the power section and control section of each other).

The object of the invention is to simplify the construction and circuitry as much as possible in an apparatus of the originally described kind. A further feature is intended to enable the control section to be combined with the power section in a very small space.

According to the invention, this object is achieved by covering the top of the container with an insulating plate which contains connection orifices and is provided with a metal coating at least in the vicinity of each of these orifices, a seal being effected between the orifices and the metal coating by introducing connecting elements and soldering them.

In this arrangement, a single insulating plate is used for forming all or a considerable part of the insulated lead-through portions. The metal coating for the various orifices is applied in one operation. The soldered joints can as a rule also be made in a single operation after introduction of the connecting elements. All these steps are known in the manufacture of wiring plates and can be readily carried out on a mass-production basis. There is no difficulty in making the lead-through portions so tight that the container is properly sealed against escape of its contents.

In a further arrangement, the control section can be disposed above the insulating plate and at least part of its switching elements can be carried on this plate. Thus the insulating plate performs an additional function which enables the control section to be arranged directly on the container accommodating the power section, i.e. a construction occupying very little space and very short wiring runs are achieved.

Preferably, the insulating plate is covered with a metal screening plate which, in particular, may be bonded thereto and which has cutaway portions near the connection orifices. This metal plate screens the control section from the power section in such a way that impulses occurring in the heavy-current part cannot have an harmful effect upon the switching element of the control section. Furthermore the insulating plate can be reinforced by the screening plate to such an extent that it is also enabled to carry relatively heavy components either of the control group or the power group.

In particular the metal screening plate, alone or in conjunction with the insulating plate, can carry the power section.

In a preferred embodiment, the metal coatings are disposed on the underside of the insulating plate and, some of them at least, are components of a printed circuit. In this way, the upper face of the insulating plate is kept free for accommodating a wide variety of constructional and switching elements.

While the current parts of the printed circuit may be washed by the cooling fluid, this has an insulating effect. In this way, the insulating plate can perform a further function whereby wiring is rendered less complicated, The expression "printed circuit" is here to be taken in its broad sense. In the simplest case, it simply covers conduction paths, but can also include capacitances and inductances. Any known technique is suitable for its manufacture, either positive printing, in which the conducting material is applied only at the required points, using, for example, the screen-pressure method, or negative printing, in which a uniform metal surface is etched away at the places where it is not required and is thus rendered non-conducting.

If switching elements of the control section are interconnected by way of the printed circuit of the underside of the insulating plate, the latter acts as a wiring plate for the control section, so that the known simplifications associated with plate technique are achieved. Although this calls for further insulating orifices in the wall of the container i.e. in the insulating plate, this causes no difficulty however either as regards sealing or manufacturing technique, since these additional orifices can be treated in the same way as the others.

It is also possible to interconnect switching elements of the power section by way of the printed circuit on the underside of the insulating plate. Simplified leads are obtained in the heavy-current part in this way.

The current path of the printed circuit can also be used to interconnect two orifices, a connecting element being introduced into one orifice from above and a connecting element being fitted in the other orifice from below. In this way a connection between the switching element of the control section and a switching element of the power section can be established. Although the number of orifices is increased (this, as mentioned above, causing no difficulties), the connection technique is simplified however.

In preferred embodiment, several connecting elements are brought together in a row and project through a common cutaway portion in the metal screening plate. In this way there is obtained a metal screening plate containing a minimum of cutaway portions. Here, the connecting elements, arranged in a row, can be parts of a terminal strip for connecting individual wires. They can however also form part of a plug strip for plugging in units of the control sections, e.g. parts of a plate.

Figure 4:
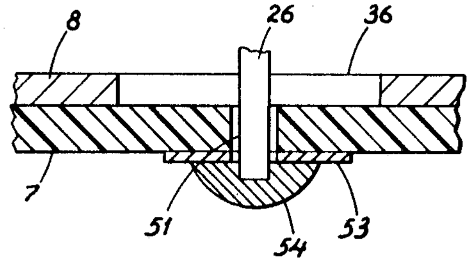
Figure 2:
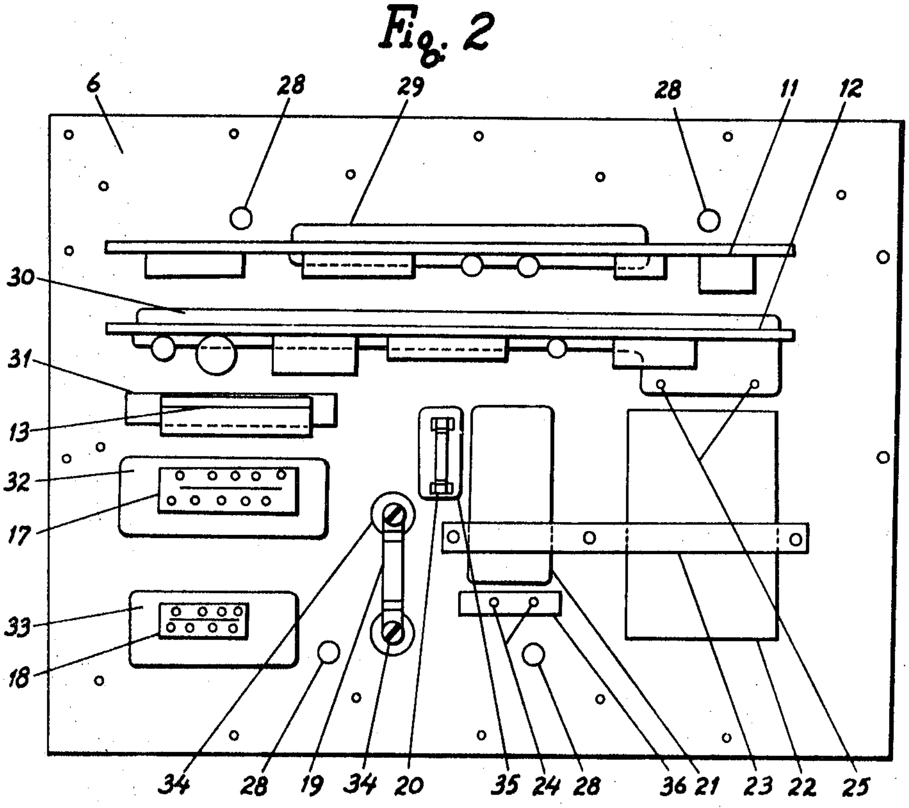
Figure 3:
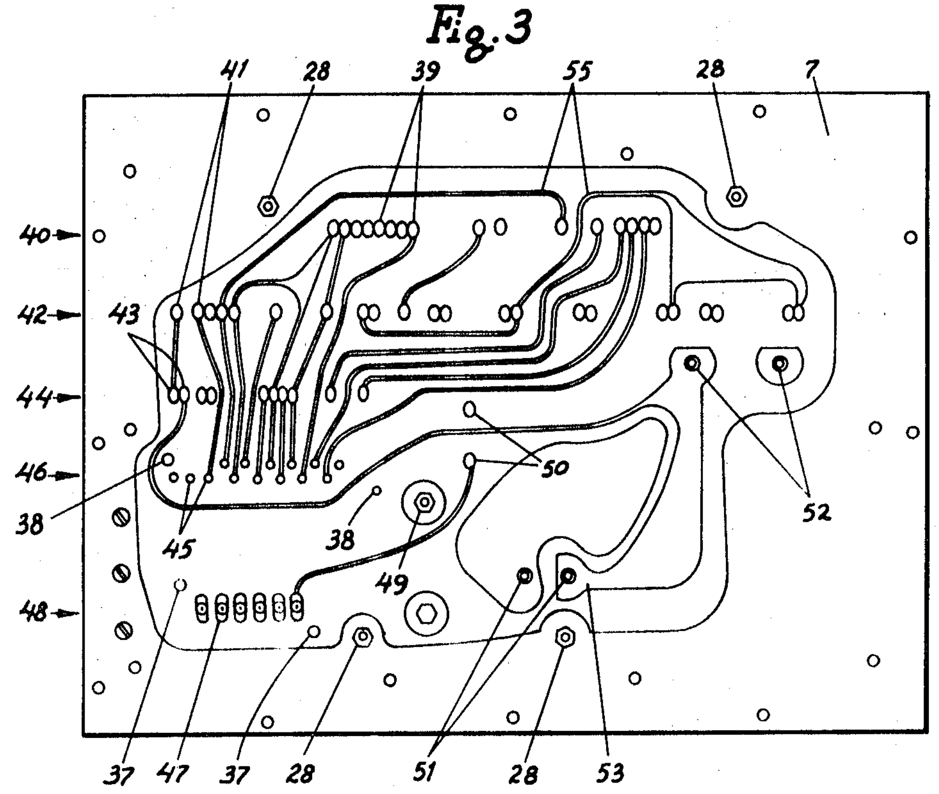

The invention will now be described in more detail by reference to an embodiment illustrated in the drawing, in which:

FIG. 1 is a schematic cross section through the electrical apparatus of the invention, FIG. 2 is a schematic plan view of the apparatus, FIG. 3 is a schematic view from below of the insulating plate, i.e. of the cover plate, but with the sides reversed, and FIG. 4 is a section through a lead-through portion.

In FIG. 1 there is illustrated a container 1, which contains a power section 2, shown only schematically, or the important parts of this power section. The container is filled with cooling oil to a level 3 and is closed by a cover plate 6, a seal 5 being interposed. The cover plate consists of an insulating plate 7 and a metal screening plate 8 bonded thereto. The power section 2 is suspended from this two-layer cover plate 6 with the help of anchor screw bolts 9. The position of the bolts 9 is displaced from that shown in FIGS. 2 and 3 for the sake of clarity.

Located on the cover plate 6 are a control section 10 and further switching and connecting elements. Forming part of the control section are two plates 11 and 12, which are provided on one side with a printed circuit and on the other with switching elements, and a plate 13, on which are grouped the adjustable switching elements, these being in the case, for example, of control means for a motor, potentiometers for compensating the slip, for adjusting the starting moment or for adjusting the speed. These plates are inserted in plug strips 14, 15 and 16, which are secured directly to the insulating plate 7. Two terminal strips 17 and 18, likewise secured to the insulating plate 7, are used for connecting the equipment, e.g. engine, operated by the apparatus, and for the connection of outer elements, which affect the control, e.g. speedometers, voltmeters etc. Furthermore, a resistor 19 and a fuse 20 are mounted on the plate 7. A coil arrangement 21 and a condenser 22 are secured to the metal screening plate 8 with the help of a bowed member 23; their connection 24 and 25 are provided with connecting elements 26 and 27 which lead to the insulating plate 7.

As can be seen in FIG. 2, the cover plate has at its edges holes which serve for the attachment of the cover plate to the container 1. Also provided are openings 28 through which the anchor screw bolts 9 for holding the power section 2 extend. The metal screening plate 8 contains a row of cutaway portions, i.e. a hole 29 near the plug strip 14, a hole 30 near the plug strip 15 and the connecting elements 27, a hole 31 near the plug strip 13, a hole 32 near the terminal strip 17, a hole 33 near the terminal strip 18, two holes 34 at the ends of the resistor 19, a hole 35 near the fuse 20, and a hole 36 near the connecting element 26.

FIG. 3 shown the underside of the insulating plate 7. In addition to the above-mentioned holes 28, there can also be seen holes 37 for securing the terminal strip 18, and holes 38 for securing the terminal strip 17. In addition there are numerous orifices each of which is surrounded by a metal coating. The orifices are for the most part arranged in rows. The pairs 39 of orifices in a row 40 are used for receiving connecting elements of the plug strip 14. The pairs 41 of elements of row 42 are for receiving connecting elements of the plug strip 15. The pairs 43 of orifices of row 44 are for accommodating the connecting elements of the plug strip 16. The individual orifices 45 in row 46 are for accommodating the connecting elements of the terminal strip 17. The individual orifices 47 in the row 48 are for accommodating connecting elements of the terminal strip 18. The individual orifices 49 receive connecting elements of the resistor 19, the pairs 50 of orifices accommodate connecting elements for the fuse 20. Individual orifices 51 are for accommodating the connecting elements 26 of the coil arrangement 21, the individual orifices 51 for receiving the connecting elements 27 of the condenser 22.

As shown in FIG. 4, which illustrates a connection orifice 51, the connecting elements 26 is pushed through the orifice 51 which is surrounded by a metal coating 53. A drop 54 of solder-metal on the one hand connects the connecting element 26 to the metal coating 53 and on the other hand closes the orifices 51.

FIG. 3 illustrates how the individual metal coatings can also be interconnected in the manner of a printed circuit, so that conduction paths 55 are created. Switching elements of the control section are interconnected through these conduction paths; in a similar manner however, elements of the power section can also be connected with each other. Not only can a connecting element be introduced into the orifices from above, but connecting elements 56 can also be introduced into them from below and soldered up. If required, one orifice can simultaneously accommodate a connection element introduced from above and one inserted from below.

In another embodiment, the insulating plate 7 was completely covered on its underside with a conducting layer of metal, using the vapor-deposit technique. All the superfluous portions were then etched away. After all the connecting elements had been introduced into the appropriate orifices they were all soldered in at the same time in one operation.

I claim:

1. Electrical apparatus comprising a container, a power section and insulating cooling fluid in said container, a cover plate of an insulating material on said container, holes in said plate each being surrounded by a metal coating bonded to said insulating material, control section apparatus mounted on said cover plate, connector elements extending through said holes and being soldered to said metal coatings to provide electrical connections therebetween and to provide fluidtight sealing for said holes, conduction means electrically connecting at least parts of said control apparatus to said connector elements, and conduction means on the underside of said cover plate electrically connecting said power section to at least one of said metal coatings.

2. Electrical apparatus according to claim 1 wherein said control section apparatus includes switching elements carried by said cover plate.

3. Electrical apparatus according to claim 1 including a metal screening plate attached to said cover plate.

4. Electrical apparatus according to claim 3 wherein said screening plate supports at least a portion of the weight of said power section.

5. Electrical apparatus according to claim 1 including a printed circuit on the underside of said cover plate, said metal coating being on the underside of said cover plate and forming a portion of said printed circuit.

6. Electrical apparatus according to claim 5 wherein said control section apparatus includes switching elements carried by said cover plate, said switching elements being interconnected through said printed circuit.

7. Electrical apparatus according to claim 6 wherein said power section includes switching elements, said power section switching elements being interconnected through said printed circuit.

8. Electrical apparatus according to claim 5 wherein said cover plate has first and second holes each being surrounded by a metal coating bonded to said insulating material, said holes being connected by said printed circuit, a first connector element extending from above into said first hole and a second connector extending from below into said second hole, said first and second connectors being soldered respectively to said metal coating surrounding said first and second holes to provide electrical connections therebetween and provide fluidtight sealing for said first and second holes.

9. Electrical apparatus according to claim 3 including a plurality of holes each of which has a surrounding metal coating and a connector extending therethrough which is soldered to the surrounding metal in the same manner as said first hole, said holes being arranged in rows, said metal screening plate having single openings each of which surrounds a group of said holes.

10. Electrical apparatus according to claim 9 including a terminal strip for connecting a group of connectors extending through said holes.

11. Electrical apparatus according to claim 9 including plug strips attached to some of said connectors extending through said holes.